(12) United States Patent
Zhang et al.

(10) Patent No.: US 8,526,408 B2
(45) Date of Patent: Sep. 3, 2013

(54) SUPPORT OF UICC-LESS CALLS

(75) Inventors: Da Jiang Zhang, Beijing (CN);
Changhong Li, Espoo (FI); Pasi Ismo Eronen, Helsinki (FI)

(73) Assignee: Nokia Corporation, Espoo (FI)

( * ) Notice: Subject to any disclaimer, the term of this patent is extended or adjusted under 35 U.S.C. 154(b) by 288 days.

(21) Appl. No.: 12/525,501

(22) PCT Filed: Feb. 5, 2008

(86) PCT No.: PCT/EP2008/051385
§ 371 (c)(1),
(2), (4) Date: Jan. 7, 2010

(87) PCT Pub. No.: WO2008/095918
PCT Pub. Date: Aug. 14, 2008

(65) Prior Publication Data
US 2010/0142499 A1    Jun. 10, 2010

Related U.S. Application Data

(60) Provisional application No. 60/899,643, filed on Feb. 6, 2007.

(51) Int. Cl.
*H04W 40/00* (2009.01)
(52) U.S. Cl.
USPC .................... 370/338; 455/456.1; 340/5.81
(58) Field of Classification Search
USPC .............. 455/419, 411, 456.1, 433; 370/338, 370/352; 340/5.81
See application file for complete search history.

(56) References Cited

U.S. PATENT DOCUMENTS

| 6,957,060 | B1 | 10/2005 | Sharp |
| 2010/0009659 | A1* | 1/2010 | Netanel et al. ............. 455/411 |
| 2010/0120409 | A1* | 5/2010 | Shieh et al. ............... 455/419 |

FOREIGN PATENT DOCUMENTS

| WO | 20050109930 A | 11/2005 |
| WO | 20050112488 A | 11/2005 |

OTHER PUBLICATIONS

Office Action received from corresponding Australian Patent Application No. 2008212898, dated Mar. 29, 2011, 2 pages.
Office Action received from corresponding European Patent Application No. 08708686.4, dated Dec. 3, 2010, 4 pages.
Office Action received from corresponding Korean Patent Application No. 10-2009-7018547, dated Mar. 21, 2011, 9 pages.
Office Action received from corresponding Russian Patent Application No. 2009133260/09 dated Nov. 22, 2010, 9 pages.
S2-051950: VoIP emergency call support, 3GPP TSG SA WG2 Architecture S2#48 S2-051950 Sep. 5-9, 2005.
3GPP TS 33.234 V6.0.0 (Mar. 2004) Technical Specification 3rd Generation Partnership Project; Technical Specification Group Service and System Aspects; 3G Security; Wireless Local Area Network (WLAN) interworking security (Release 6), 6.1.1 and 6.1.5, 6 pages.
3G TS 23.003 V3.1.3 (Sep. 1999) Technical Specification 3rd Generation Partnership Project; Technical Specification Group Core Network; Numbering, addressing and identification (3G TS 23.003 version 3.1.3).

(Continued)

*Primary Examiner* — Phuoc Doan
(74) *Attorney, Agent, or Firm* — Squire Sanders (US) LLP

(57) ABSTRACT

The invention relates to a method comprising initiating a session from a subscriber terminal, wherein the subscriber terminal does not comprise a specific user identification module, and authenticating the session based on a temporary identification of the subscriber terminal, by using a procedure performing a server authentication and avoiding a client authentication.

22 Claims, 2 Drawing Sheets

(56) References Cited

OTHER PUBLICATIONS

Chinese Office Action in Chinese Application No. 200880004289.7, dated Jan. 29, 2012.
Office Action received in corresponding Japanese Application No. 2009-548681, Dated Oct. 24, 2011, 7 pages.
Korean Office Action in Korean Application No. 10-2009-7018547, dated Mar. 19, 2012.
Office Action dated Feb. 4, 2013 for corresponding Chinese Patent Application No. 200880004289.7 with partial English translation.
African Office Action, dated Jul. 31, 2012; Issued on Corresponding Application No. AP/P/2009/004967.
Office Action dated Jun. 29, 2012, Issued from the National Office of Intellectual Property of Vietnam for Application No. 1-2009-01875.
Office Action dated Sep. 10, 2012, for corresponding Chinese Patent Application No. 200880004289.7.
Canadian Office Action in Canadian Application No. 2,676,997, dated Mar. 26, 2012.
"International Search Report and The Written Opinion of the International Searching Authority", in corresponding PCT Application No. PCT/EP2008/051385, Dated Jul. 18, 2008, 13 pages.

* cited by examiner

SUPPORT OF UICC-LESS CALLS

RELATED APPLICATION

This application was originally filed as PCT Application No. PCT/EP2008/051385 filed Feb. 5, 2008, which claims priority to U.S. Provisional Application No. 60/899,643 filed Feb. 6, 2007.

BACKGROUND OF THE INVENTION

1. Field of the Invention

The invention relates to a method and device for supporting calls such as IMS emergency calls from a subscriber terminal having no subscriber identity module (UICC-less in I-WLAN access network.

2. Description of the Related Art

The growth of public WLANs provides an opportunity for appropriately-equipped terminal devices (or user equipments (UE) in 3rd generation terminology) to access cellular home networks and visited networks via such WLANs. WLANs which provide such an interworking functionality are therefore referred to as I-WLANs. The I-WLANs are connected to public land mobile networks (PLMNs) enabling UEs to access network services on home networks (HPLMNs) and visited networks (VPLMNs).

Wireless devices will be bound by law to support emergency calls. Reporting of an emergency should be possible even when no session is currently active over a particular radio channel of a multi access device, i.e. the user is presently not attached to any radio, or a subscriber identity module (SIM) or universal mobile telecommunications system SIM (USIM) is presently not inserted in the device.

Usually, emergency reports initiated by pulling a switch or calling an emergency number are generally treated in a prioritized manner, so that access is readily available to invoke the emergency alarm. However, wireless devices may not have reliable functions or be used reliably during an emergency, so that entering of passwords or other authentication processes may not be done correctly. Moreover, a wireless device may be near a network or access network but not associated to that network. Therefore authorization is not needed before the alarm is sounded or contact is made to the emergency center in order to expedite the Emergency call.

I-WLAN (interactive wireless local area network) access is defined in specifications TS 23.234, 33.234, 24.234 and 29.234 of the 3rd generation partnership project (3GPP). For direct IP access (so-called Scenario 2) and 3GPP IP access (so-called Scenario 3), an Extensible Authentication Protocol (EAP) SIM/AKA (Authentication and Key Agreement) procedure is used for authentication, wherein authorization is done based on a subscriber check against information held at a subscriber database, e.g., a home subscriber server (HSS).

The W-APN Network Identifier for the support of IMS Emergency calls shall take the form of a common, reserved Network Identifier of the form "sos", e.g. "sos.w-apn.mnc012.mcc345.pub.3gppnetwork.org", as defined in TS23.003.

This kind of W-APN indicates to a WLAN access network or to a 3GPP AAA Server that access is needed for an emergency call or another prioritized call.

At present, there is no agreed solution in 3GPP yet for which kind of authentication method and user ID will be used for UICC-less users (users without a universal integrated circuit card) to access I-WLAN for IMS emergency.

It is possible to use a common user name and common password for all users in I-WLAN for UICC-less IMS emergency call.

In temporary document S2-051950 of 3GPP TSG SA WG2 Architecture, 5-9 Sep. 2005, a Voice over Internet Protocol (VoIP) emergency call support is described, where VoIP emergency calls are supported via a WLAN by using a pseudo IMSI (International Mobile Subscriber Identity) to facilitate WLAN access. The pseudo IMSI can then be used to create a user-specific pseudo network access identifier (NAI) to be used for initial access and the authentication procedure. The pseudo IMSI is made up of a unique combination of mobile country code (MCC) and mobile network code (MNC) and digits from the international mobile equipment identity (IMEI). VPLMNs advertised by the WLAN could either all be capable of supporting authentication using the pseudo NAI for emergency services or might be presented to a UE in a prioritized order indicating capability and willingness to support this. The VPLMN would then treat the UE as a temporary home subscriber and either skip authentication and authorization (AAA) or ensure that it succeeds.

However, also in this case, the session can not be continued.

In current TS 23.234, the requirement for support IMS emergency calls is to provide WLAN UEs with IP bearer capability to access IMS Emergency calls for both UICC and UICC-less cases. Moreover, authentication may be (i) skipped entirely or (ii) use a dummy or null authentication method.

Thus, currently, no reliable mechanism is specified for UICC-less user's IMS Emergency calls over I-WALN. And there is no definition of the user ID to be used for UICC-less user, which is needed to form the NAI (together with the W-APN).

SUMMARY OF THE INVENTION

Hence, it is an object of the present invention to solve the problem mentioned above and to provide a reliable mechanism for handling calls such as IMS emergency calls from a UICC-less user in I-WLAN system.

According to embodiments of the present invention, this object is solved by a method comprising initiating a session from a subscriber terminal, wherein the subscriber terminal does not comprise a specific user identification module, and authenticating the session based on a temporary identification of the subscriber terminal, by using a procedure performing a server authentication and avoiding a client authentication.

Alternatively, according to embodiments of the present invention, the object is solved by a device, comprising a controller configured to initiate a session, wherein the device subscriber terminal does not comprise a specific user identification module, and to create a temporary identification, wherein an authenticating procedure is used which performs a server authentication and avoids a client authentication.

Further alternatively, according to embodiments of the invention, the above object is solved by a device comprising a transceiver configured to receive an authentication request message from a subscriber terminal, wherein the subscriber terminal does not comprise a specific user identification module, and a controller configured to carry out an authentication based on the temporary identification by using a procedure performing a server authentication and avoiding a client authentication.

Thus, according to the claims, the authentication is performed by a procedure (authentication method or protocol) which does not perform a client authentication, but perform a server authentification.

In this way, emergency calls from UICC-less subscriber terminals can reliably be handled.

BRIEF DESCRIPTION OF THE DRAWINGS

The invention is described by referring to the enclosed drawings, in which.

DETAILED DESCRIPTION OF THE PREFERRED EMBODIMENT

In the following, preferred embodiments of the present invention is described by referring to the attached drawings.

According to the present embodiment, it is proposed to use an extensible authentication protocol—transport layer security (EAP-TLS) as an authentication method in I-WLAN for UICC-less users in case of an IMS emergency.

Namely, EAP-TLS can skip client authentication. However server authentication is still provided. It means it is still possible to get keys for continuing and user ciphering if it's needed. By this way, no changes to WLAN AN are required.

Figure 1:
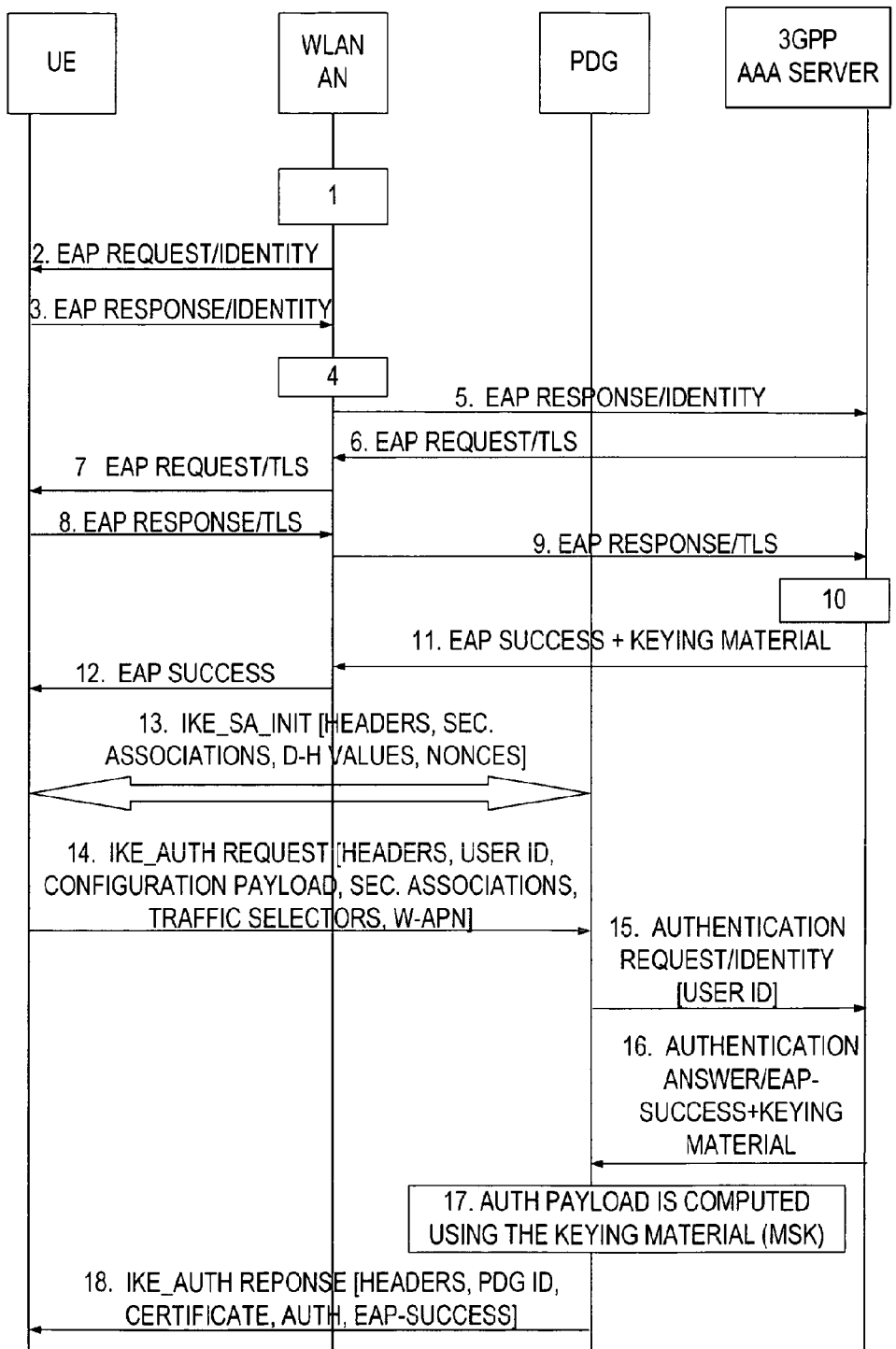
FIG. 1 shows a message signaling diagram according to a first embodiment of the invention, and FIG. 2A to 2D basic configurations of network elements involved in the embodiments of the present invention.

A detailed signaling sequence for an emergency call of a UICC-less users is shown in FIG. 1. It is noted that only the main network elements in this sequence are shown, namely a user entity (UE), a WLAN access network (AN), which may be single network element or distributed elements, a packet data gateway (PDG) and an authorization and accounting (AAA) server.

In step 1, A connection is established between the WLAN user entity (UE) and the WLAN access network (AN), using a Wireless LAN technology specific procedure.

In step 2, The WLAN AN sends an EAP Request/Identity to the WLAN UE. It is noted that the EAP packets are transported over the Wireless LAN interface encapsulated within a Wireless LAN technology specific protocol.

In step 3, the WLAN UE sends an EAP Response/Identity message. The WLAN UE sends a user identity, complying with network access identifier (NAI) format specified in 3GPP TS 23.003. The realm part of the NAI in the user identity is populated with the emergency specific realm. That is, as mentioned above, the realm may comprise "sos", for example. The UICC-less WLAN UE's identity can be IMEI, MAC address or local IP address assigned by WLAN AN (as an example for an access network element) together with WLAN AN info, as will be described in the following in more detail.

In step 4, the message is routed towards the proper 3GPP authentication, authorization and accounting (AAA) server based on the realm part of the NAI. The routing path may include one or several AAA proxies (not shown in the figure).

It is noted that also a diameter referral can be applied to find the AAA server.

In step 5, the 3GPP AAA Server receives the EAP Response/Identity packet that contains the terminal identity. With the realm part of the NAI in the user identity populated with the emergency specific realm as defined in 3GPP TS 23.003, 3GPP AAA Server identifies the user is requesting for an emergency call, based on the received identity. 3GPP AAA Server shall set an Emergency Access flag.

The identifier of the WLAN radio network and the MAC address of the WLAN UE shall also be received by the 3GPP AAA Server in the same message.

In step 6, the 3GPP AAA Server initiates the authentication using EAP-TLS, in which client authentication is omitted. That is, no subscriber identity as such (i.e., as it would be in the case of a subscriber with a UICC) is checked.

In step 7, the WLAN AN forwards the EAP Request/TLS to the WLAN UE.

In step 8, the WLAN UE responds with EAP Response/TLS.

In step 9, the WLAN AN forwards the EAP Response/TLS to the 3GPP AAA Server.

In step 10, a master session key (MSK) is derived from TLS master secret, cf. RFC 4346.

In step 11, The 3GPP AAA Server sends the EAP success message to WLAN AN. The WLAN AN can store the keying material (MSK) which can be used in communication with the authenticated WLAN UE.

In step 12, the EAP success message is forwarded to WLAN UE.

In step 13, The WLAN UE and the PDG exchange the first pair of messages, known as IKE_SA_INIT (see TS 33.324, for example), in which the PDG and WLAN UE negotiation cryptographic algorithms, exchange nonces and perform a Diffie_Hellman exchange.

In step 14, the UICC-less WLAN UE sends the user identity (in the Idi payload) and the emergency W-APN information (in the Idr payload) in this first message of the IKE_RUTH phase, and begins negotiation of child security associations. The WLAN UE's indicates by the realm part in its NAI to the PDG that the connection request is for emergency call and that it wants to use EAP over IKEv2.

The user identity shall be compliant with Network Access Identifier (NAI) format specified in IETF RFC 4282 (December 2005: "The Network Access Identifier"). According to IETF RFC 4306 (December 2005: "Internet Key Exchange (IKEv2) Protocol"), the shared secret generated in an EAP exchange (the MSK), when used over IKEv2, shall be used to generated the AUTH parameter.

If the WLAN UE's Remote IP address needs to be configured dynamically, then the WLAN UE shall send the configuration payload (CFG_REQUEST) within the IKE_AUTH request message to obtain a Remote IP Address.

In step 15, The PDG sends the authentication request message with an empty EAP attribute-value pair (AVP) to the 3GPP AAA Server, containing the user identity. The PDG shall include a parameter indicating that the authentication is being performed for tunnel establishment. This will help the 3GPP AAA Server to distinguish between authentications for WLAN access and authentications for tunnel setup.

In step 16, the 3GPP AAA Server shall check whether the Emergency_Access flag is set for the user. If the Emergency_Access flag is set and the W-APN is not that for emergency as defined in 3GPP TS 23.003, the Result-Code shall be set to DIAMETER_AUTHORIZATION_REJECTED.

When all checks are successful, the 3GPP AAA Server sends the Authentication Answer including an EAP success and the key material to the PDG. This key material shall consist of the master session key (MSK) generated during the authentication process. When the Wm interface (PDG-3GPP AAA Server) is implemented using Diameter, the MSK shall be encapsulated in the EAP-Master-Session-Key parameter, as defined in reference RFC 4072 (August 2005: "Diameter Extensible Authentication Protocol (EAP) Application").

In step 17, the MSK shall be used by the PDG to check the AUTH parameters in order to authenticate the IKE SA INIT phase messages, as specified in reference IETF RFC 4306 (December 2005: "Internet Key Exchange (IKEv2) Protocol)".

In step 18, the PDG responds with its identity and a certificate. It completes the negotiation of the child security associations as well. EAP Success message is also forwarded to the WLAN UE.

In the following, it is described how the user identity (as used in steps 3 and 13, for example) can be formed.

Namely, if a common user name/password provided to all users for UICC-less IMS emergency call, the problem is how to define such name/password and if someone deliberately make a false emergency call, there is no way to trace it based on common name/password.

According to the present embodiment, three kinds of identities are proposed for a UICS-less UE: international mobile equipment identity (IMEI), medium access control (MAC) address and IP address.

In particular, in case 3GPP restricts the connection such that it should be from a mobile terminal (i.e., from a terminal in which a SIM card can be inserted into it), then IMEI or hashed IMEI shall be used. The IMEI may be used in a hashed form since the length of the IMEI is 15 bytes, which might not be suitable for all cases. The IMEI or the hashed IMEI is then used be as the user identity at step 3 and 14 in FIG. 1.

The benefit of using hashed IMEI at this step is that it can prevent impersonation. The UE can use hashed IMEI at this step 3 and use the original complete IMEI at step 14. So even an attacker can eavesdrop the hashed IMEI and use it to start another emergency call, he can get the proper IMEI to be used at step 14. The correct hashed IMEI will not be generated at the PDG if PDG receives a wrong IMEI from an attacker at step 14. That is, when a hashed IMEI is included in the EAP response/identity in step 3, an attacker could possible get this hashed IMEI by listening on the wireless link and could use it to attach the PDG at step 14. Hence, in case a unhashed full IMEI is used in the AUTH_request in step 14, then, even if the attacker was able to get the hashed IMEI (in step 3), he/she could not use it to attack the PDG, since he does not know the full IMEI.

Alternatively, in case 3GPP allow other WLAN UE such as PDA or notebook to make IMS emergency call, the MAC address can be used in the following ways, at steps 3 and 14:

1) MAC address. Each WLAN UE should have a unique MAC address.

Each WLAN UE should have a unique MAC address. The length of the ID is the shortest.

2) MAC address+WLAN AN ID (SSID).

This can provide the location of the emergency call to get to know the location of the emergency, or to trace false calls. If an attacker uses another MAC address in the same WLAN AN, it will be detected. Alternatively, it is possible to use a hashed (MAC address+WLAN AN ID (SSID)).

3) Local IP address (assigned by WLAN AN)+WLAN AN ID (SSID).

This can provide the location of the emergency call, so that it is possible to trace false calls. If an attacker uses another IP address in the same WLAN AN, it will be detected. Alternatively, also a hashed combination of the local IP address+WLAN AN ID may be used.

When an UE connects to WLAN AN to have a scenario 2 connection, it can use a user identifier at step 3, e.g., userID@sos.w-apn.mnc012.mcc345.pub.3gppnetwork.org.

That is, in an initial message (step 3), the subscriber terminal uses the user identifier. In response to this, the AAA server can get the UE's MAC/IP address and WLAN AN info from WLAN AN. Thus, in response thereto, in step 5, AAA server can form the user ID from the MAC/IP (and WLAN AN info) received from WLAN AN.

When UE sets up scenario 3 connection with PDG, since the realm part in its NAI can indicate to the PDG the connection request is for emergency call and it wants to use EAP over IKEv2, and there is already shared key (MSK) between WLAN UE an AAA server, WLAN UE can generate the AUTH parameter and send to PDG. PDG can get the MSK from AAA server to check the AUTH. In this way no more step is needed as in normal scenario 3.

Thus, according to present embodiment, an authentication method such as the EAP-TLS authentication method, which can skip a client authentication, is used in I-WLAN for UICC-less users in case of emergency call.

In this way, a server authentication is still provided. The server authentication enables generating shared MSK between WLAN UE and AAA server for using EAP over IKE2.

Thus, the authentication is only for server, not for client. So the network won't reject the emergency call (EM-call). There are two purposes of the authentication.

One is to keep the WLAN AN unchanged. Otherwise WLAN AN shall check the NAI of the UE to identify if it's for EM-call. The other is to generate the MSK to be used in the Scenario 3 procedure.

Moreover, it is possible to set up encrypted tunnel to PDG if AAA Server does not have authentication vectors for this terminal (=UICC-less case). Namely, as described above, the MSK can be generated from the TLS master secret as specified in RFC 4346 in UE and AAA server. PDG can get the MSK from the 3GPP AAA server. So the encrypted tunnel can be set up between UE and PDG.

There isn't change needed at WLAN AN. AAA server needs to form the user ID from MAC/IP (and WLAN AN ID).

Thus, a reliable and authenticated connection can be established in a UICC-less case.

In the following, a second embodiment of the invention is described, in which the case is considered that an attacker may start double emergency calls.

In detail, according to TS33.234 simultaneous sessions are allowed in both scenario 2 and 3 (i.e., via IP access and 3GPP access), and the numbers of the simultaneous sessions are based on operators' policy. The request to have simultaneous sessions is valid especially in the WLAN UE split case. For example, a user can use his mobile terminal to visit a website of operator and use his notebook to access the VPN of his company at the same time.

However when a user makes an IMS emergency call through a UICC-less terminal (as described in the first embodiment, for example), it's unreasonable for him to have simultaneous IMS emergency calls. If it happens, the second one may be a fraud one and may be vandalism towards emergency service. So simultaneous IMS emergency calls through a UICC-less terminal shall be forbidden.

According to the present embodiment, a corresponding control is carried out at PDG, i.e., the W-APN for emergency call, instead of AAA server because WLAN UE may not receive the EAP success message (at step 12 of FIG. 1) and doesn't start the scenario 3 procedures.

When the PDG receives the request from WLAN UE (at step 14), it should check if there is already a session for the user. If yes, it shall reject the new request instead of accepting it. The rationale is that it's difficult for an attacker to know the victim's ID in advance, but can intercept it during UE sets up scenario 2 connection.

From the UE ID, the PDG can know it is an UICC-less IMS emergency call.

Thus, according to the present embodiment, double emergency calls are reliably detected and prevented.

In the following, the network elements involved in the above-described embodiments are described by referring to FIGS. 2A to 2D. It is noted that in FIGS. 2A to 2D only the basic elements are shown in order to simplify the drawings.

Figure 2A:
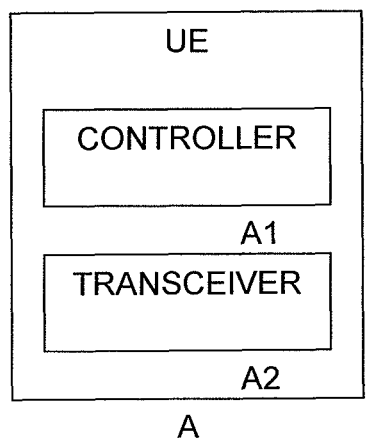

FIG. 2A shows the basic configuration of a subscriber terminal A. The subscriber terminal A comprises a controller A1 and a transceiver A2. The controller A2 may include a CPU and different kinds of memory units such as RAM, ROM, or the like. A computer program may be stored in the memory and may comprise software code portions for carrying out the method according to the embodiments. This computer program may be stored on a recording medium such as a CD ROM, for example, and may be directly loadable into the work memory of the controller. Alternatively, the computer program may be loaded via the network into the memory of the controller.

Figure 2B:
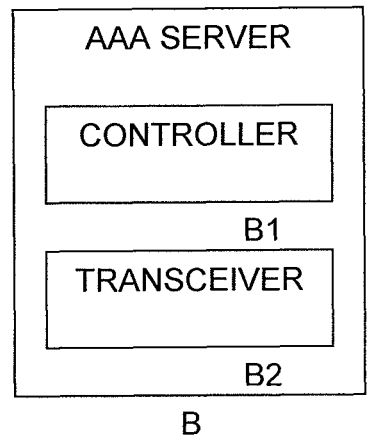

FIG. 2B shows the basic configuration of the AAA server B, which comprises a controller B1 and a transceiver B2. The controller B1 may be configured in a similar way as the controller. That is, also the controller B2 may include a CPU and different kinds of memory units such as RAM, ROM, a hard disk, a CD or DVD ROM reader or the like. A computer program may be provided to the AAA server in a similar way as described above. The transceiver B2 may comprise one or more interfaces, by which a connection via a network to other network elements may be provided.

Figure 2C:
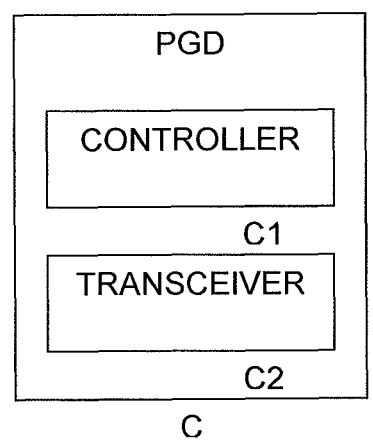

FIG. 2C shows a basic configuration of the PGD C, which is similar to the configuration of the AAA server B, so that the description thereof is not repeated.

Figure 2D:
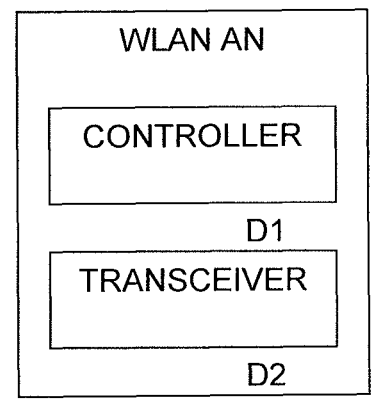

FIG. 2D shows a basic configuration of the WLAN AN, which is also similar to the configuration of the AAA server B, so that the detailed description thereof is omitted.

The invention is not limited to the embodiments described above, and various modifications are possible.

In particular, the authentication method (or authentication procedure) is not limited to EAP-TLS. In particular, any other suitable method could be used in which the client authentication may be omitted.

Moreover, the subscriber terminal identifier is not limited to the IMEI. That is, any other identifier which uniquely identifies a terminal may be used.

Furthermore, the authentication sequence and the network elements involved are not limited to the details as shown in FIG. 1 and described above. Alternatively, the different steps may be carried out in a different order or by involving less or more network elements as appropriate.

Furthermore, the IMS emergency call mentioned above is only an example for a UICC-less call. In particular, there might be other situations in which a UICC-less call could be allowed. For example, a UICC-less call might be allowed by a network in order to contact an operator of the provider.

The invention claimed is:

1. A method comprising:
   initiating a session from a subscriber terminal, wherein the subscriber terminal does not comprise a specific user identification module;
   forming a temporary identification of the subscriber terminal;
   based at least in part on the temporary identification, performing a server authentication without performing client authentication,
   wherein the temporary identification comprises a user identifier and a realm, the realm comprising a specific indication for a session initiated by the subscriber terminal,
   wherein the user identifier is created based at least in part on one of an international mobile equipment identity, a media access control address of the subscriber terminal, and an internet address assigned by an access network element to the subscriber terminal.

2. The method according to claim 1, wherein the server authentication comprises the use of an extensible authentication protocol transport level security (EAP/TLS) protocol or internet key exchange (IKE) protocol.

3. The method according to claim 1, wherein the temporary identification comprises a user identifier and a realm, the realm comprising a specific indication for a session initiated by the subscriber terminal.

4. The method according to claim 3, wherein the specific indication indicates an emergency.

5. The method according to claim 3, wherein the user identifier is created based on at least one of:
   a terminal identifier;
   a media access control address of the subscriber terminal; and
   an internet protocol address assigned by an access network element to the subscriber terminal.

6. A method comprising:
   initiating a session from a subscriber terminal, wherein the subscriber terminal does not comprise a specific user identification module;
   forming a temporary identification of the subscriber terminal;
   based at least in part on the temporary identification, performing a server authentication without performing client authentication,
   wherein the temporary identification comprises a user identifier and a realm, the realm comprising a specific indication for a session initiated by the subscriber terminal
   wherein the user identifier is created based at least in part on a combination of at least one of:
   a media access control address of the subscriber terminal and a network identifier; and a hashed combination of the media access control address and the network identifier.

7. A method comprising:
   sending an authentication request to a subscriber terminal for authenticating a session initiated from the subscriber terminal;
   receiving an authentication response/identity message from the subscriber terminal, wherein the authentication response/identity message comprises a temporary identification of the subscriber terminal; and
   authenticating the session based at least in part on the temporary identification of the subscriber terminal, wherein a server authentication is performed but client authentication is omitted,
   wherein the temporary identification comprises a user identifier and a realm, the realm comprising a specific indication for the session initiated by the subscriber terminal, wherein the subscriber terminal does not comprise a specific user identification module,
   wherein the user identifier is created based at least in part on one of an international mobile equipment identity, a media access control address and an internet address assigned by an access network element to the subscriber terminal.

8. The method according to claim 7, further comprising generating a shared master session key which can be used for user data ciphering.

9. The method according to claim 7, wherein the temporary identification comprises a user identifier and a realm, the realm comprising a specific indication for the session initiated by the subscriber terminal, wherein the subscriber terminal does not comprise a specific user identification module.

10. The method according to claim 7, further comprising:
checking whether there is already a session for the subscriber terminal; and rejecting a new session in case there is already a session.

11. An apparatus, comprising:
at least one processor; and
at least one memory including computer program code
the at least one memory and the computer program code configured to, with the at least one processor, cause the apparatus to perform at least the following:
initiating a session, wherein the apparatus does not comprise a specific user identification module;
forming a temporary identification; and
based at least in part on the temporary identification, performing a server authentication without performing client authentication,
wherein the temporary identification comprises a user identifier and a realm, the realm comprising a specific indication for a session initiated by the apparatus,
wherein the user identifier is created based at least in part on one of an international mobile equipment identity, a media access control address of the subscriber terminal, and an internet address assigned by an access network element to the apparatus.

12. The apparatus according to claim 11, wherein the authentication comprises the use of an extensible authentication protocol transport level security (EAP/TLS) protocol or internet key exchange (IKE) protocol.

13. The apparatus according to claim 11, wherein a master session key is generated which can be used for user data ciphering.

14. The apparatus according to claim 11, wherein the temporary identification comprises a user identifier and a realm, the realm comprising a specific indication for a session initiated by the apparatus.

15. The apparatus according to claim 14, wherein the specific indication indicates an emergency.

16. An apparatus, comprising:
at least one processor; and
at least one memory including computer program code
the at least one memory and the computer program code configured to, with the at least one processor, cause the apparatus to perform at least the following:
sending an authentication request to a subscriber terminal;
receiving an authentication response/identity message from the subscriber terminal,
wherein the authentication response/identity message comprises a temporary identification of the subscriber terminal; and
carrying out an authentication based at least in part on the temporary identification,
wherein a server authentication is performed but client authentication is omitted,
wherein the temporary identification comprises a user identifier and a realm, the realm comprising a specific indication for a session initiated by the subscriber terminal, wherein the subscriber terminal does not comprise a specific user identification module,
wherein the user identifier is based at least in part on one of an international mobile equipment identity, a media access control address of the subscriber terminal and an internet protocol address assigned by an access network element to the subscriber terminal.

17. The apparatus according to claim 16, wherein the processor is further configured to generate a master session key, wherein the master session key is generated for user data ciphering.

18. The apparatus according to claim 16, wherein the temporary identification comprises a user identifier and a realm, the realm comprising a specific indication for a session initiated by the subscriber terminal, wherein the subscriber terminal does not comprise a specific user identification module.

19. The apparatus according to claim 18, wherein the specific indication indicates an emergency.

20. The apparatus according to claim 16, wherein the processor is configured to check whether there is already a session for the subscriber terminal, and to reject a new session in case there is already a session.

21. A computer-readable medium encoded with instructions that, when executed by a computer, perform:
initiating a session for emergency service from a subscriber terminal, wherein the subscriber terminal does not comprise a specific user identification module;
creating a temporary identification of the subscriber terminal;
based at least in part on the temporary identification, performing a server authentication without performing client authentication,
wherein the temporary identification comprises a user identifier and a realm, the realm comprising a specific indication for a session initiated by the subscriber terminal,
wherein the user identifier is created based at least in part on one of an international mobile equipment identity, a media access control address of the subscriber terminal, and an internet address assigned by an access network element to the subscriber terminal.

22. A computer-readable medium encoded with instructions that, when executed by a computer, perform:
sending an authentication request to a subscriber terminal for authenticating a session for emergency service initiated from the subscriber terminal;
receiving an authentication response/identity message from the subscriber terminal, wherein the authentication response/identity message comprises a temporary identification of the subscriber terminal; and
authenticating the session based at least in part on the temporary identification of the subscriber terminal, wherein a server authentication is performed but client authentication is omitted,
wherein the temporary identification comprises a user identifier and a realm, the realm comprising a specific indication for the session initiated by the subscriber terminal, wherein the subscriber terminal does not comprise a specific user identification module,
wherein the user identifier is created based at least in part on one of an international mobile equipment identity, a media access control address and an internet address assigned by an access network element to the subscriber terminal.

* * * * *